(12) United States Patent
Stroot et al.

(10) Patent No.: US 9,763,382 B2
(45) Date of Patent: Sep. 19, 2017

(54) APPARATUS FOR TRANSPLANTING PLANTS

(71) Applicants: Plant Tape USA, Inc., Salinas, CA (US); Plant Tape Altea SL, Barcelona (ES)

(72) Inventors: Bram Gerardus Stroot, Barcelona (ES); Carlos Joaquin Gusi Gracia, Barcelona (ES)

(73) Assignee: Plant Tape USA, Salinas, CA (US)

( * ) Notice: Subject to any disclaimer, the term of this patent is extended or adjusted under 35 U.S.C. 154(b) by 134 days.

(21) Appl. No.: 14/536,541

(22) Filed: Nov. 7, 2014

(65) Prior Publication Data

US 2015/0150188 A1   Jun. 4, 2015

Related U.S. Application Data

(60) Provisional application No. 62/021,042, filed on Jul. 4, 2014.

(30) Foreign Application Priority Data

Nov. 8, 2013  (DK) ................................ 2013 70660

(51) Int. Cl.
*A01C 11/00* (2006.01)
*A01C 11/02* (2006.01)
*A01C 5/04* (2006.01)

(52) U.S. Cl.
CPC .............. *A01C 11/02* (2013.01); *A01C 11/00* (2013.01); *A01C 5/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,145,771 A | * | 1/1939 | McCartney | A01C 11/02 111/100 |
| 2,475,078 A | * | 7/1949 | Cherry | A01C 11/02 111/109 |
| 2,831,442 A | | 4/1958 | Montguire | |
| 4,106,415 A | | 8/1978 | Hakli | |
| 4,611,428 A | * | 9/1986 | Hakli | A01G 9/104 111/105 |
| 4,644,880 A | * | 2/1987 | Branch | A01C 11/025 111/105 |
| 4,829,915 A | * | 5/1989 | Ahm | A01C 7/048 111/105 |
| 7,213,366 B1 | | 5/2007 | Ahm | |

(Continued)

FOREIGN PATENT DOCUMENTS

| | | | | |
|---|---|---|---|---|
| AU | 2007100035 B4 | 3/2007 | | |
| BE | EP 0488981 A1 | * 6/1992 | ............. | A01C 11/02 |

(Continued)

OTHER PUBLICATIONS

Danish Patent Office Search Report for PA 2013 70660 dated Jun. 13, 2014.

*Primary Examiner* — Alicia Torres
(74) *Attorney, Agent, or Firm* — FisherBroyles LLP; Victoria L. Boyd

(57) ABSTRACT

An apparatus useful in the transplantation of plants. The apparatus for transplanting plants comprises a transplanting module configured to transplant a plurality of plants in a row.

21 Claims, 12 Drawing Sheets

(56) References Cited

U.S. PATENT DOCUMENTS

| | | |
|---|---|---|
| 7,356,964 B2 | 4/2008 | Ahm |
| 7,421,960 B2 | 9/2008 | Ahm et al. |
| 7,614,181 B2 | 11/2009 | Ahm |

FOREIGN PATENT DOCUMENTS

| | | | |
|---|---|---|---|
| DE | 849197 C * | 9/1952 | ........... A01C 11/025 |
| DE | 2309879 B1 * | 4/1974 | ........... A01C 11/025 |
| EP | 0137399 A2 | 4/1985 | |
| EP | 0182263 B1 | 4/1990 | |
| EP | 1230833 B1 | 12/2004 | |
| FR | 1085381 A | 2/1955 | |
| FR | 77956 E | 5/1962 | |
| GB | 886146 A | 1/1962 | |
| WO | WO2004/107843 A2 | 12/2004 | |

\* cited by examiner

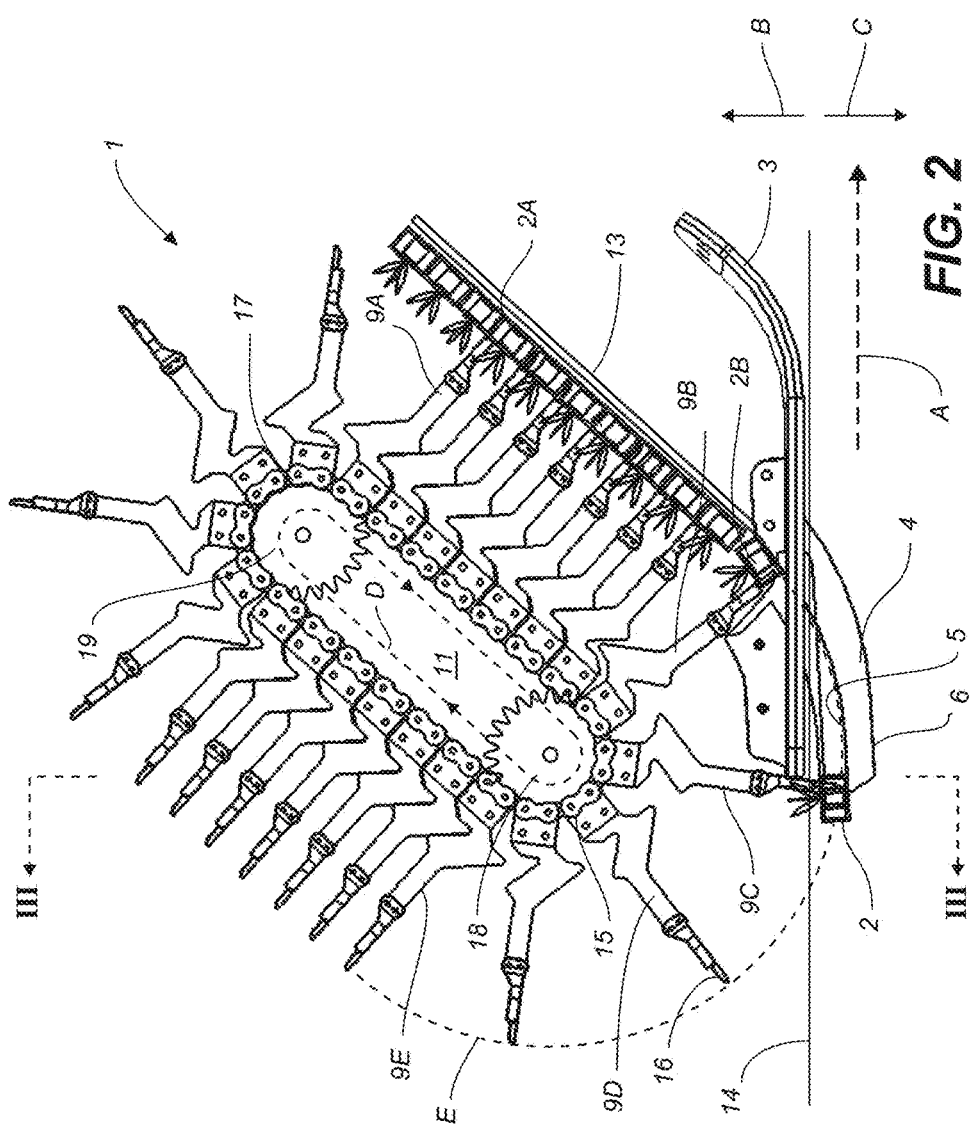

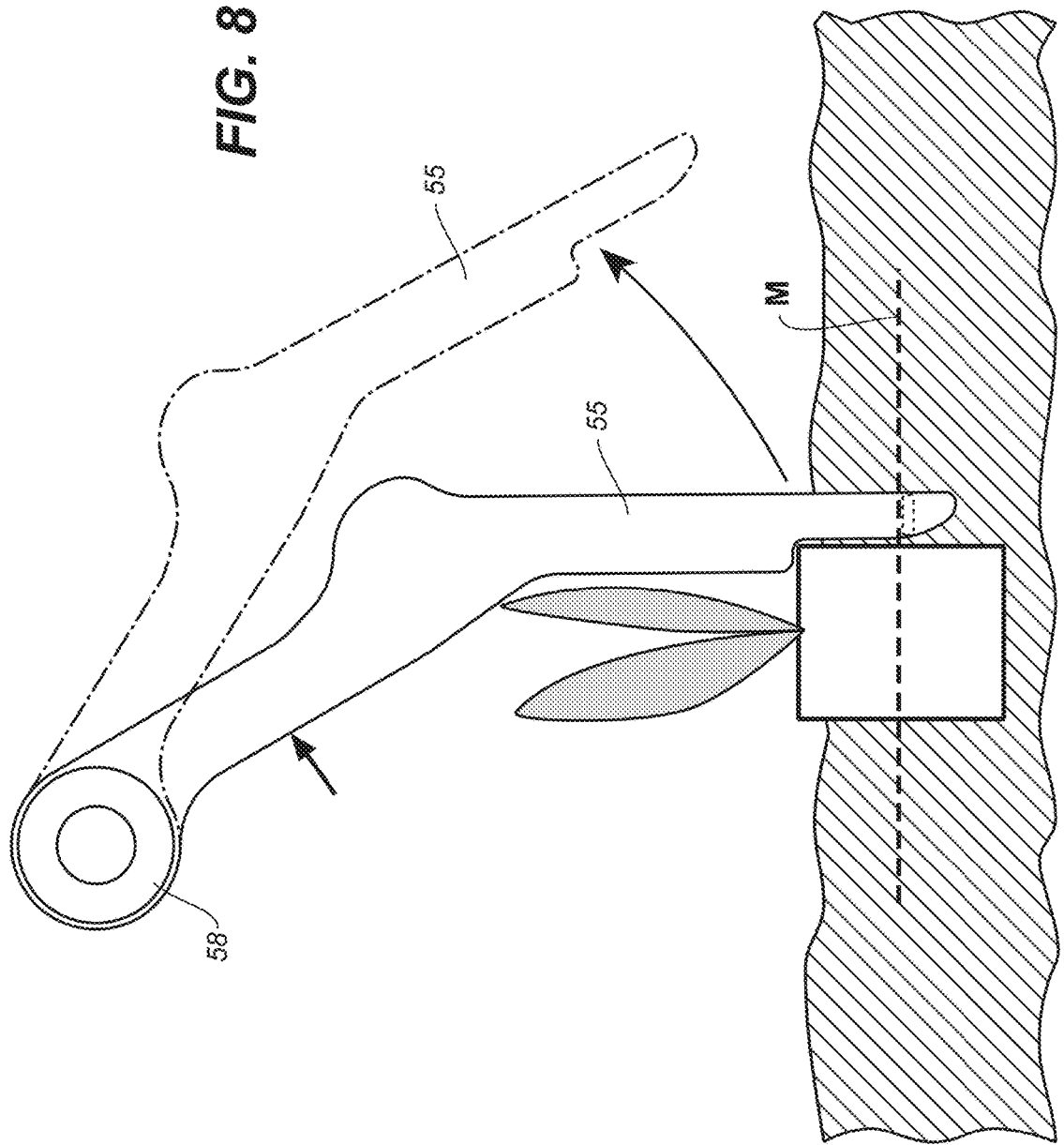

APPARATUS FOR TRANSPLANTING PLANTS

CROSS-REFERENCE TO RELATED APPLICATIONS

The present application is related to Danish Priority Application No. PA 2013 70660, entitled AN APPARATUS FOR TRANSPLANTING PLANTS, filed 8 Nov. 2013, and U.S. Provisional Application 62/021,042 entitled AN APPARATUS FOR TRANSPLANTING PLANTS, filed 4 Jul. 2014.

TECHNICAL FIELD

The present disclosure is directed to an apparatus and a method for transplanting plants comprising a transplanting module configured to transplant a plurality of plants in a row.

BACKGROUND

The transplanting of plants and/or seedlings from a greenhouse, nursery bed, or other growing locations into the ground is often an operation that is performed, in order to improve the efficiency of harvesting. The advantages to transplanting plants/seedlings into a field or a soil may be seen as an extension a growing season by starting the growing plants indoors before outdoor conditions are favourable. It is possible to protect young plants from diseases and pests and avoid germination problems by planting seedlings instead of direct seeding.

The operation of manual transplanting has been done for a long time and may be seen as a very time consuming process, as the plants have to be planted by hand into the soil, and the time for each transplant is very high. Thus, in professional agriculture operations the transplanting is often done by apparatuses that are capable of preparing the soil, as well as assisting in positioning the plants in the correct positions. Such transplanters may be seen as e.g. a rotational transplanter, where the apparatus prepares the ground in a single row, while the seedlings or plants are manually introduced into a rotating magazine so that the apparatus can position the plants in the soil, before the next plant is introduced into the ground.

The problem with semi-automatic single row transplanters is that it is very time consuming to transplant an entire field of crops, as the speed of transplantation is dependent on the speed of the operator, and only one row can be worked on at a time. Thus, there is a need for quicker method of transplanting seedlings/plants.

AU 2007100035 introduces a transplanting apparatus for high density planting of seedlings into a substantially flat, smooth bed in several rows, where each row is provided with a seedling drop tube, blades that extend laterally below a skid plate for cutting a furrow for each row, and having means for holding and discharging a seedling delivered from the drop tube in a position for planting in the furrow. This apparatus is capable of transplanting more seedlings at a time, meaning that a higher number of seedlings are introduced into the ground in a transverse direction.

However, a problem with such an apparatus is that the speed of introduction of seedlings in the direction of planting, i.e. along the row, is limited, due to mechanical limitations as to the fact that the blades cannot be dragged in the ground at highs speeds, due to high forces and impacts the ground would transmit into the blades. Furthermore, the furrows are cut into the ground by a the wedge shaped blades, which means that the material removed from the furrows that are cut must be moved out of the furrow, which causes a high mechanical stress on the blades.

Therefore, there is a need for a transplanting apparatus that is capable of transplanting seedling into the ground at a high speed, at high consistency, in order to minimize the amount of time used for each seedling in a row, so that the efficiency of the transplant operation is optimized. The consistency of the transplant operation means that it is possible to optimize the use of the soil of a field for the growth of plants, in order to ensure that each plant has the correct area of soil in order to grow in an efficient manner.

BRIEF SUMMARY OF THE INVENTION

In accordance with the invention, there is provided an apparatus for transplanting plants comprising a transplanting module configured to transplant a plurality of plants in a row, the transplanting module comprising: a soil contacting surface (skid plate) being substantially planar to a soil to be planted, a keel member to create a furrow in the soil where the keel extends a predefined distance below the soil contacting surface, where an outer periphery of the keel member defines the depth of the furrow, a carrying means configured to support the plant, where the carrying means ex-tend from a position that is above the soil contacting surface to a position below the soil contacting surface, and extending a predefined depth into the furrow for transporting of the plant from the apparatus and into the furrow where the carrying means has a distal end for discharging the plant, and where the carrying means are configured to expose an outer periphery of the plant below the soil contacting surface so that at least one side wall of the furrow comes into contact with an outer periphery of the plant before the plant is discharged from the distal end of the carrying means, a transport means for supporting and transporting the plant via the carrying means and into the furrow along a longitudinal axis that is substantially parallel to the planting direction of the apparatus, where the transport means is configured to release the plant, when the plant has reached its predefined depth into the furrow.

In accordance with the invention the keel member and the carrying means may be separate parts/member that are capable of completing the objectives of the parts/members. Alternatively, the parts/members integral as a single member that is capable of completing all the aspects of the parts/members.

The apparatus in accordance with the invention is capable of transplanting plants at a high speed and with a very consistent accuracy, in the distance between each transplanted plant/seedling. The apparatus may be attached to a vehicle, such as a tractor, that is capable of transporting the apparatus to the transplant site or the field. Alternatively the apparatus may be self-driving, i.e., having the necessary mechanical components to be driven on its own or that the apparatus is an integral part of a transplanting vehicle. When the transplanting is to commence, the apparatus may be lowered towards the ground or the soil, so that the soil contacting surface may be in contact with the surface of the soil.

When the apparatus has been introduced/lowered into position to begin the transplanting operation, the vehicle may manoeuvre the apparatus in the transplanting direction, i.e. the direction of the row to be transplanted. The soil contacting surface ensures that the apparatus has the correct vertical position, relative to the surface of the soil, ensuring that the keel member and/or the carrying means extend a predefined depth into the ground/soil, creating a furrow having the desired depth, and ensuring that the plant is introduced at a certain depth into the furrow. The soil contacting surface may assist in the compacting of the soil, so that it may be easier to create the furrow and may also assist to control the planting depth, in ensuring that the apparatus does not sink into the soil. The soil contacting surface may be in the form of a skid plate, ski, wheels or any type of surface that is capable of controlling the penetration depth of the apparatus.

The keel member extends from the soil contacting surface in a vertical direction downwards into the ground, allowing the apparatus to penetrate the soil during the planting operation, and while it is being carried in the planting direction will create a furrow that extends in the same direction as the planting direction of the apparatus/vehicle. The keel may have an outer periphery, which may define the lowest point of the apparatus, and where the outer periphery defines the depth of the furrow to be created. This means that the outer periphery of the keel creates at least the bottom (lowest part) of the furrow. The keel ensures that the furrow is provided with side walls and a bottom, where the keel keeps at least parts of the furrow open during the transplanting operation at least until the plant has been correctly introduced into the furrow. Thus, the keel member may also function as a support member to the furrow, ensuring that the furrow does not collapse before plant has been introduced.

The width of the furrow may be controlled by the transverse width of the keel member, so that the transverse periphery of the keel member may abut the side wall of the furrow, during transplanting operation and thereby ensuring that the soil is pushed from the volume created by the keel member that defines the furrow, where the material may either be pushed forward or to the sides.

The apparatus may be loaded with a plurality of plants, that may be introduced e.g. in the form of a tray or in a seedling tape, where each plant is introduced into the carrying means. The carrying means may be capable of carrying a plurality of plants, where the plants are lined up in a row, one after another, similar to the function of a magazine or a conveyor belt. The transport means may be adapted to grab onto the plant, while the plant is inside the apparatus, and where the transport means is adapted to convey the plant from inside the apparatus and along the carrying means into the furrow.

The transport means introduces the plant into the furrow in a direction that is parallel to the furrow, so that the plant is "slid" into the furrow. The combination of the using the carrying means to support the plant and the transport means to convey the plant ensures that the plant is only released at the correct instance, so that it is ensured that the plant extends a predefined depth below the surface of the soil. The predefined depth below the surface of the soil may be chosen based on the type of plant to be planted, and may be adjusted for each type of plant.

When the plant has reached its lowest position the side wall of the furrow has grabbed the sides of the plant, so that the orientation and depth of the plant is set. Thus, the plant is fixed in the soil and movement of the plant relative to the apparatus is controlled by the movement of the apparatus relative to the soil, and there is no need to support the plant. Thus, the movement of the apparatus will ensure that the apparatus is pulled away from the plant.

Subsequently, the next plant is introduced into the furrow at a different longitudinal position from the previous plant, and is planted by the apparatus in accordance with the above.

In one embodiment the transport means releases the plant when a distal part of the plant has passed the distal end of the carrying means. This means that the plant has passed the distal end, and is no longer or only partly supported by the carrying means.

In some embodiments, the transport means is fixed. The term "fixed" means that the pushers do not bend at any point along the length of arm.

In an embodiment, the transport means is retractable. The term "retractable" as used with regard to the pushers means that there is at least one point of rotation along the length of the arm, e.g., between the main arm (52) and the lower arm (53) as shown in FIG. 5A.

Retraction of the transport means allows for the adjustment of distance between the transplanted plants as well as at a high rate of transplanting (i.e., the tractor may be driven at a higher speed). A higher density of transplanted plants on a parcel of land may be achieved using the retractable transport means. In addition, the retractable transport members allow a more rapid planting of a unit of land. In one embodiment, the distance between the transplanted plants may range from 10 centimeters to 24 centimeters in a row. The distance may be between 8 centimeters to 65 centimeters, between 4 inches to 24 inches. The distance between the plants is constant and not varied during the planting.

When a plurality of modules is being used the plants may be planted as parallel rows or off-set rows. The plants in an off-set configuration are planted relative to the neighboring row so as to form a diamond shape as is know to one of skill in the art. This allows for a higher density of plants per unit land. The neighboring modules are adjusted to provide this off-set by way of independently setting the timing of when the pushers advance the plant into the soil.

In one embodiment of the invention the apparatus may further comprise a compacter to compact the soil that is to be planted. Some types of soil may be relatively loose, especially if the soil is dry, and it may be necessary to compact the soil, prior to introducing the keel into the ground to create the furrow. In some situations the soil may be so loose that the keel, on its own, will not create a well-defined furrow, as the side walls may crumble, collapse or fall apart, as the soil is so loose. An example of such loose soil may e.g. be dry sand, which is not capable of maintaining its shape when it is manipulated. Thus, in order to prepare the soil correctly to create a well-defined furrow, it may be advantageous to compact the soil before the keel enters the soil, so that the density of the soil is increased and to allow it to be shaped in a furrow. Often the water content of the soil may influence the pliability of the soil and its ability to maintain its shape, but pressure to compact the soil is often enough to ensure the pliability and shape holding capabilities of the soil.

In one embodiment of the invention the plant to be transplanted may be a seedling.

In one embodiment of the invention the plant to be transplanted may comprise an enclosure to hold the seedling. Such an enclosure may be seen in EP0182263, where the enclosure may be a tape or packaged tape provided along the length thereof with pockets containing plants or seedlings. When the plant is provided in a tape, having a plurality of pockets containing plants, the apparatus may comprise a cutting mechanism to separate the pockets/enclosures into discrete elements that are to be planted. The enclosures may be introduced into the carrier means, and the transport means may manoeuver the enclosures into the ground.

In one embodiment the carrying means may be configured to provide support the plant from below, at least one side and/or from above, ensuring that the orientation of the plant is maintained in a predetermined fashion during the transport and until the discharge of the plant into the soil. The carrying means may be arranged to have a cross sectional profile that may correspond to the cross sectional profile of the plant, so that the carrying means is capable ensuring that the plant is fed towards the furrow during transplanting operation in a manner that ensures that the final position of the plant prior to and after discharge is optimal. The support from below ensures that the plant is not manoeuvred below a predefined point in the process of moving the plant from the apparatus and towards the distal end of the carrying means, and minimizes the chance that the plant is not discharged at a position in the furrow that may be considered too deep. The side support may either be on one side, or on both sides, ensuring that the transverse position of the plant is correct during the transport of the plant via the carrying means. This ensures that the plant is introduced in the correct transverse position into the furrow, and thereby ensuring that it may be correctly positioned. The support from above ensures that the plant is manoeuvred at a correct depth into the furrow, so that when the plant is discharged inside the furrow, the soil will cover the plant enough for the roots to grow into the ground. If the plant is positioned too high inside the furrow, there is a risk that the roots will not penetrate the soil and thereby rendering the plant incorrectly transplanted and thereby risking a reduced success rate. The plant may be supported on both sides top and bottom during the transplanting operation. This may ensure that the plant is incapable of rotating or manoeuvring out of its predefined desired position during the transport. Should this desired position fail, the plant may rotate, turn or twist in an undesired manner, which may not be recoverable and result in that the plant could be discharged incorrectly into the ground, thereby rendering the transplant unsuccessful.

In one embodiment the carrying means may comprise a through-going opening at a transverse periphery of the carrying means allowing a side wall of the furrow to come into contact with the plant. The through-going opening may be arranged below the soil contacting surface, so that the opening may abut the side wall of the furrow. By allowing the side wall of the furrow to come into contact with a side wall of the plant, it is possible to reduce the forces that are necessary to transport the plant towards the distal part of the carrying means, as the movement of the plant relative to the side wall will transfer energy to the plant due to friction between the two parts. The friction assists in transporting the plant and ensures that the discharge of the plant from the carrying means/apparatus is gradual rather than sudden. The friction between the plant and the side wall of the furrow may be increased from the proximal end towards the distal end of the carrying means, as the side wall of the furrow may begin gradually to fall in towards the plant. Thus, the velocity difference between the plant and the furrow will gradually become less and less up to the discharge of the plant from the carrying means, until the plant is transplanted and the plant is in the ground.

In one embodiment the carrying means may separate the plant from the soil in a vertical direction prior to discharge. By having carrying means that separate the plant from the soil in a vertical direction, the carrying means may be placed between the plant and the ground ensuring that the plant does not come into contact with the bottom of the furrow, until it has been discharged from the carrying means. This may protect the roots of the plant prior to discharge. This further ensures that the plant may be released in the correct depth of the furrow, as the carrying means is arranged between the bottom of the furrow and the plant. The carrying means may also assist in the prevention of causing the soil to push the upwards towards the surface of the soil, during transplant operation, and thereby ensuring that the plant is maintained in a predefined manner in the furrow during transplant.

In one embodiment the transport means may comprise at least one transport member having a proximal end connected to a driving mechanism and a distal end that connects with the plant to be planted. The at least one transport member may connect with the plant to be planted, where the connection may be a releasable mechanical connection. The transport member may connect with the plant while the plant is arranged on the carrying means inside the apparatus, and may be used to push the plant along the carrying means towards the distal end to be discharged from the apparatus. The opposite end of the transport member, i.e. the proximal, end may be driven by a driving mechanism that allows kinetic energy from the driving mechanism to be transferred from the driving mechanism and to the plant via the transport member. The transport member may have longitudinal axis that extends from the proximal end to the distal end, where driving direction of the transport member may be orthogonal to the longitudinal axis of the transport member.

In one embodiment the transport means may comprise at least one transport member that enters the furrow at an angled position from vertical and is adapted to rotate along the longitudinal axis of the apparatus towards a substantially vertical position where the distal end reaches its ultimate depth into the furrow and where the continued rotation raises the distal end out of the furrow. The transport member may be arranged to support the plant in such a manner that when the plant is connected to the transport member, the angle between the transport member and the plant will remain the same during the transport, and until the plant is released from the transport member to be discharged from the apparatus. Thus, the transport member may contribute to ensuring that the plant is oriented in a correct position inside the furrow, as the release of the plant from the carrying means may be synchronised with the release of the connection between the transport member and the plant. Thus the transport member will not release the plant until the plant has been rotated into its correct position inside the furrow.

In one embodiment a distal end of the transport means may be configured to release the plant at a substantially vertical position. A vertical position of the plant may be seen where the roots point substantially downwards and the leaves, stem or the top part of the plant, points substantially upwards, so that the plant may grow in a vertical position from the soil. The vertical axis of the plant may extend from the root and towards the upper part of the plant, so when the plant is in a vertical position, the vertical axis of the plant is substantially parallel to vertical.

The plant may be transported through the apparatus at any suitable angle, where the vertical axis of the plant may be angled away from vertical during the transport from the plant and towards the discharge of the plant from the apparatus. The angle of the plant during the transport may be non-relevant, and the plant may be at an angle from vertical when the transport member is connected to the plant. However, it may be advantageous that when the transport member releases the plant, the plant is in a vertical position, so that when the plant is discharged from the apparatus it will remain in a vertical position. The transport means may be configured to co-operate with the carrying means so that the rotation of the plant is supported both by the carrying means and the transport member.

In one embodiment the outer periphery of the keel member may have a proximal part and a distal part, where the distal part extends a greater distance below the soil contacting surface than the proximal part. Thus the keel may gradually create the full depth of the furrow, and the full force of the soil that is in contact with the keel may be distributed over a larger area, as the distal part of the keel is deeper than the proximal part. Thus, when the furrow is being created, the front end of the furrow is shallower than a back end of the furrow. The keel may have a front edge that may be angled away from vertical, so that the area of the outer periphery of the keel, i.e. the front edge, that cuts into the soil has an increased area, compared to a keel having a vertical front edge. I.e. by increasing the length of the front edge of the keel, the force required to create the furrow is distributed over a greater area, which reduces the wear and tear on the keel and allows the keel to be driven at a greater speed into the ground, with a minimized risk of damaging the keel.

In one embodiment the increase in distance below the soil contacting surface may be gradual along the longitudinal axis of the keel member. The front edge of the keel may have a gradual increase in depth, so that the front edge is curved. The angle of the front edge at the proximal end of the keel may be at a positive angle from horizontal (horizontal is 0 degrees), where the angle of the curve gradually converges towards horizontal.

In one embodiment at least two transplanting modules are positioned side by side in order to transplant at least two rows (a plurality). By arranging at least two transplanting modules side by side it is possible to transplant more than one row at a time, and thereby increasing the efficiency of the apparatus considerably. In alternative embodiments, the number of transplanting modules may be increased, to three, four, five, six, seven or more modules that are placed side by side, to provide the same number of rows to be transplanted. The increase in the number of modules does not influence the forces that are transmitted from the soil towards the module, as each module creates its own row, and is in contact with the soil separately from the other modules.

When the apparatus is provided with more than one module, the soil contacting surface of one of the modules may be used for all the other modules, or the soil contacting surface of the modules may be joined together, aggregated or merged, so that the adjustment of the position of the soil contacting surface relative to the keel, i.e. the depth of the furrows, may be adjusted for all rows in one adjustment of the soil contacting surface. Alternatively, the depth of the furrow may be controlled by adjusting the distance of each keel member, where the distance between the outer periphery of the keel may be adjusted relative to the soil contacting surface of the apparatus. Such movement may be done individually for each module, or collectively for all modules.

In one embodiment the vertical axis of the axis of the plant to be planted may be parallel to a longitudinal plane of the keel member, which may be the vertical plane of the keel member. Thus, the plant that is to be positioned in the furrow will be arranged directly distal to the keel member, subsequent to the plant being discharged from the carrying member. This ensures that the plant is positioned directly into the furrow created by the keel member and if longitudinal plane of the keel member is substantially vertical when the furrow is created, the plant may easily be positioned in the furrow, at a same angle as the longitudinal plane of the keel.

The keel may be provided having a longitudinal plane that is substantially vertical, creating a substantially vertical furrow, during transplanting operations.

The invention may also include a method of transplanting a plurality of plants in a row, in accordance with the steps disclosed herein.

Other objects, features and advantages of the present invention will become apparent from the following detailed description. It should be understood, however, that the detailed description and specific examples, while indicating preferred embodiments of the invention, are given by way of illustration only, since various changes and modifications within the scope and spirit of the invention will become apparent to one skilled in the art from this detailed description.

BRIEF DESCRIPTION OF THE DRAWINGS

FIG. 1B shows a retractable transport member superimposed on the transplanting module. FIG. 1C shows the transplanting module at an angle whereby the skid plate and the extended wall to guide the pushers are more clearly visible.

FIG. 2 shows parts of the transplanting module in accordance with one aspect of the invention.

FIG. 4B is the same as 4A except a yellow arrow indicates the direction of rotation of the circular piece (41) and its attached cutting means (40).

FIG. 5A is a drawing of one embodiment of the retractable transport member. The retractable transport member comprises a main arm (52) and a pushing arm (53) that is a single unit. The pushing arm comprises a connecting section (54) and a pusher (55). Also visible is the tooth (56) which helps push a plant/seed pocket, and beveled edge (59) that assists in moving dirt off of the pushing arm. The bearing (58) engages a cam or other guiding means (not shown) to maintain the retractable arm in an extended position. Once the pressure is removed the spring (51) exerts a force sufficient to retract at low planting speeds the arm in the direction back toward the main arm 52. At higher planting speeds, a second cam (not shown) will engage the shoulder (57) to push the lower arm back into the retracted position. The blue arrow indicates a bearing (58) that functions to not only reduce friction but also helps the pushing arm engage a channel within the transplanting module which results in retractable arm extending radially outward. This extension also ensures that the pushers have the proper alignment for moving the plant pockets and plant tape through the transplanting module. The tractor is moving in the direction indicated by arrow A in FIG. 2. FIG. 5B is a photograph of a second embodiment of the retractable transport member. This view is straight on and therefore a lot of detail shown in FIG. 5A or 5C is not visible. For example, the tooth (56) on the reverse side is not visible. FIG. 5C is a view of the reverse side of the retractable transport member; the bearing (58) is not visible in this view as it is on the front face. This view shows clearly that the lower pushing arm is a single piece. (Note that it may be made in multiple pieces but it is preferred to make it as a single piece.)

FIG. 8 is a schematic of the pusher assisting the placement of the plant pocket (germination unit) in the soil. The plant pocket (white square) is being pushed along by a transport member (55) with the force of the soil being indicated by the arrow (curved). The tooth on the pusher (dotted rectangle) is slightly below the mid-point of the pocket (dashed red line marked "m"). The pusher maintains proper position due to the bearing (not shown) being engaged in a channel (not shown). Not shown: the spring and a cam acting on the shoulder of the pusher will retract the pusher. The force of the cam is applied at the brown arrow. The spring exerts sufficient force (i.e., torque) such that the pusher is maintained in the retracted position if no other force is applied to the arm. However, the spring is insufficient to return the pusher to its retracted position and requires the assistance of the cam when the tractor is going at a higher speed. As the pusher is lifted back into the retracted position by the cam, the tip of the arm (where the tooth is located) passes over the plant. If the tooth is above the mid-line (m) then there is a tendency to push the plant pocket over and not place the plant in an upright position.

Figure 1A:
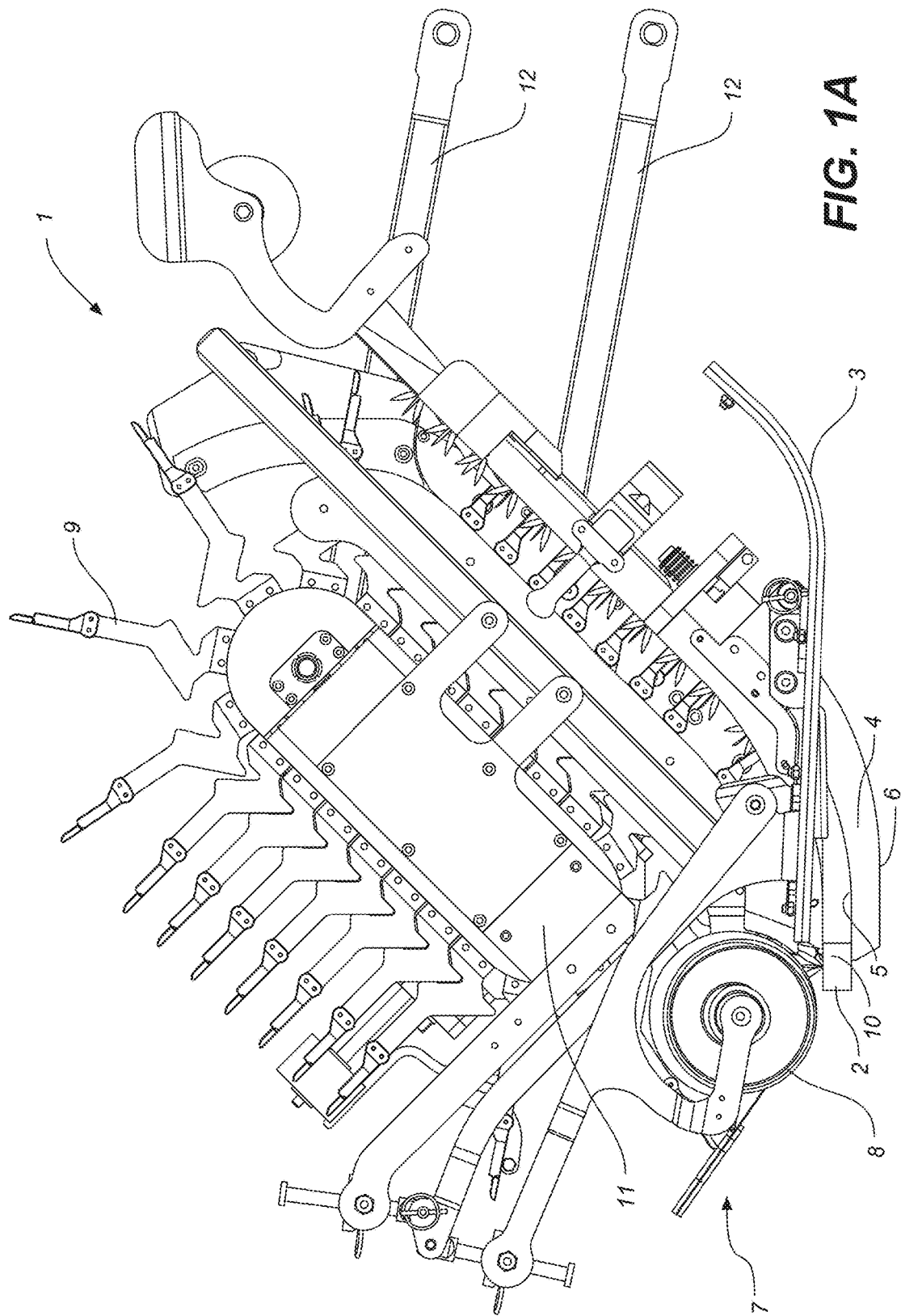
FIG. 1A-C shows a side view of a transplanting module in accordance with the invention. The transport member (9) in FIG. 1A is of the fixed configuration.

The file of this patent contains at least one drawing in color. Copies of this patent or patent publication with color drawing(s) will be provided by the Office upon request and payment of the necessary fee.

DETAILED DESCRIPTION

The invention will now be described in detail by way of reference only using the following definitions and examples.

All patents and publications, including all sequences disclosed within such patents and publications, referred to herein are expressly incorporated by reference.

Unless defined otherwise herein, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described. It is to be understood that this invention is not limited to the particular methodology, protocols, and reagents described, as these may vary.

Numeric ranges are inclusive of the numbers defining the range. The term about is used herein to mean plus or minus ten percent (10%) of a value. For example, "about 100" refers to any number between 90 and 110.

The headings provided herein are not limitations of the various aspects or embodiments of the invention which can be had by reference to the specification as a whole. Accordingly, the terms defined immediately below are more fully defined by reference to the specification as a whole.

Definitions

As used herein, "plant" means any portion or life stage of a plant that is suitable for planting using the apparatus described herein. Examples include, but are not limited to, rhizomes, seeds or seedlings. Preferably the plants are recently germinated. In an embodiment, the plant protrudes less than 2 inches above the soil (or top of the germinating unit).

A "germinating unit" is a plug of growth medium (e.g., soil) comprising seed(s) or seedling(s) and a carrier (or carrier mixture). In some instances, the germinating unit is enclosed by a biodegradable material. Two or more germinating units enclosed by a biodegradable material may form a plant tape. Reference is made to U.S. Pat. No. 7,213,366, U.S. Pat. No. 7,356,964 and U.S. Pat. No. 7,614,181.

A "plant tape" is a continuous ribbon of biodegradable material enclosing successively arranged germinating units. The plant tape may be cut into individual units (also referred to as plant pockets or germinating units) when used with the apparatus described herein.

The term "carrier" is here to be construed as a material including at least one of the substances: granulated expanded vermiculite, perlite, zeolite, cellulose materials, such as wood fibers and sphagnum, burned clay, rock wool or the like substances, whereby it is possible to obtain a desired degree of water conveying capacity, ion exchanging properties etc. A "carrier mixture" is at least two of the above substances.

The term "additive" is here primarily to be construed as water-absorbing materials, such as superabsorbing materials, i.e. absorption of $H_2O$ in order to achieve a moisture buffer, such as for instance superabsorbing polymers (SAP).

The expression "adjuvant" should here be understood so as to cover one or more substances selected among plant nutrients, plant protectants, such as pesticides, including herbicides, insecticides, especially systemic insecticides, fungicides, virae, cultures of bacteria, cultures of fungi, such as Trichoderma, fungus spores, microencapsulated fungicides, eggs from useful insects, such as predatory nematodes, fertilizers, enzymes, animal repellents, hormones, pH-adjusting agents, activated carbon, clay particles, trace elements, such as molybdenum, wood fibers or wood powder, kieselguhr, surfactants or other substances with a favorable effect on the germination and the growth of plants, where several substances are available in microencapsulated form.

The expression "biodegradable" material is here to be construed as a material gradually disintegrating and/or being part of the ordinary biological food chain within a measurable period when left alone in its natural state.

The phrase "cutting means" refers to any physical means of separating the germinating units of a plant tape. Ripping or tearing apart the germinating units is not encompassed by this term. Specific embodiments include scissors, serrated edges or knives. In some embodiments, the knives may be hollow grind, flat grind, saber grind (sometimes referred to as a "V Grind"), chisel grind, double bevel or compound grind or convex grind.

Figure 1B:
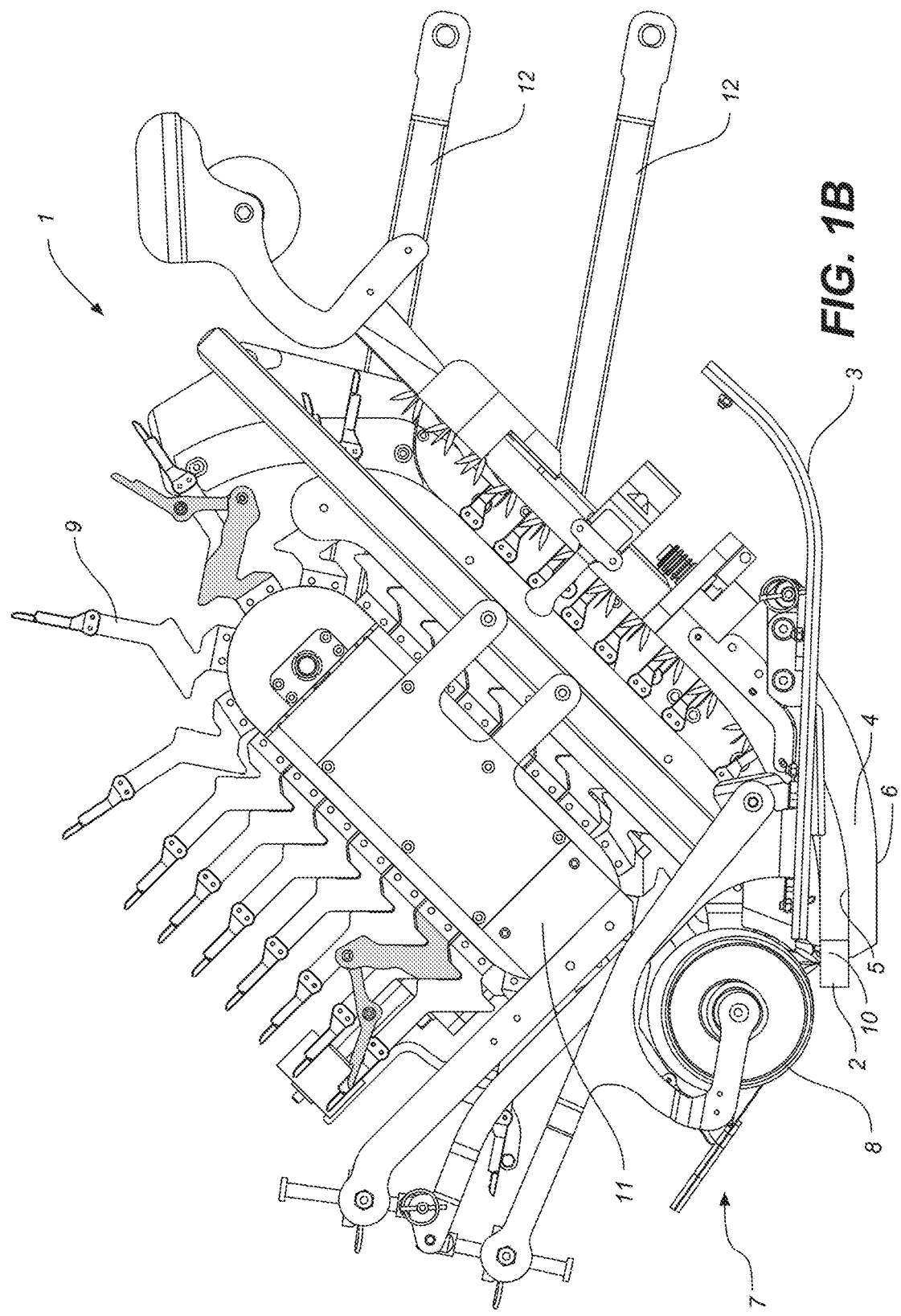
Figure 1C:
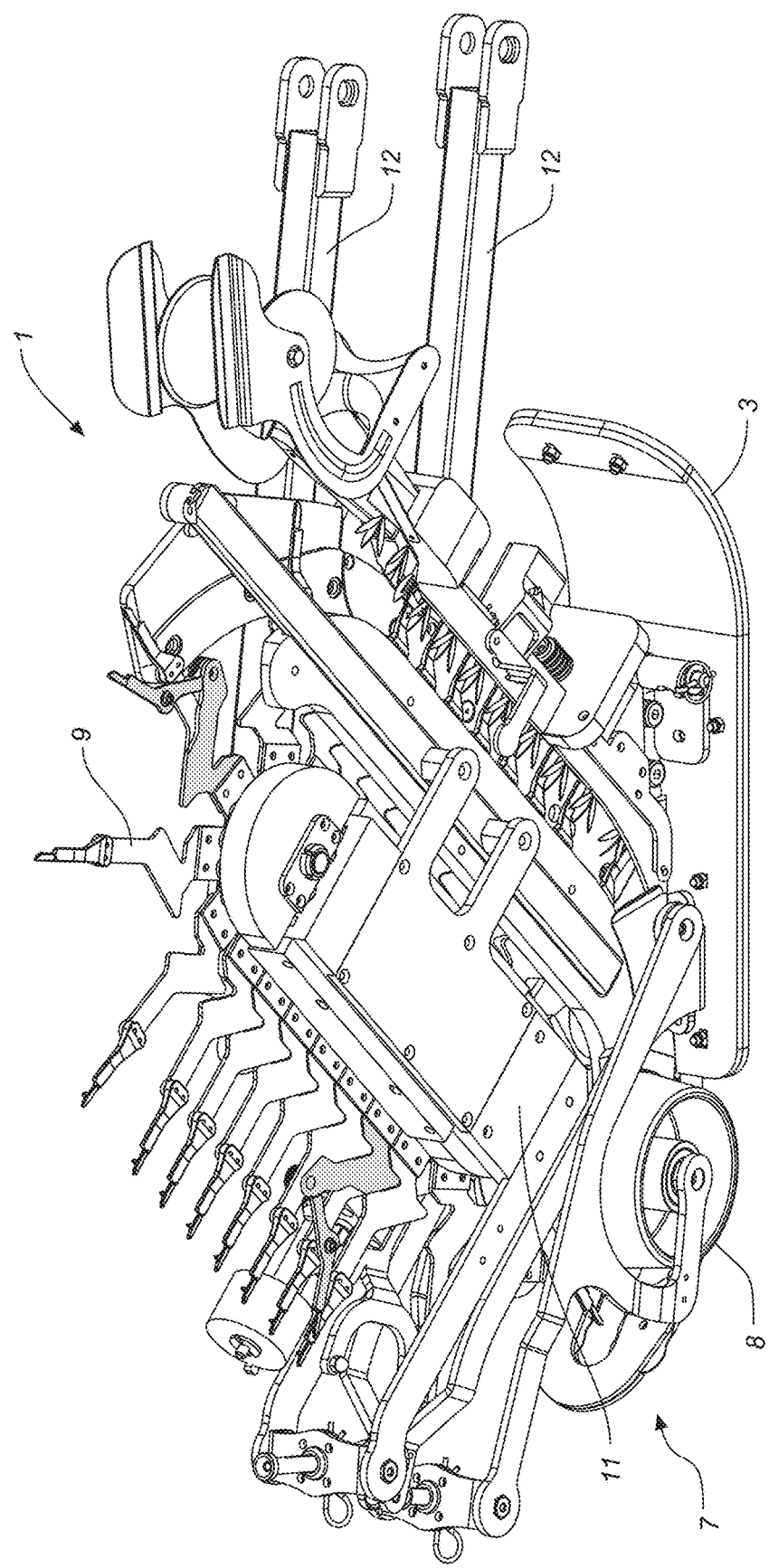

FIG. 1 shows side view of a transplanting module 1 for transplanting a plurality of plants 2. The module 1 comprises a skid plate 3, which is configured to be in contact with the surface of the ground during transplantation. The skid plate 3 has the functionality of compacting the ground to be transplanted, as the skid plate carries a part of the module's 1 weight during transplantation, and therefore asserts pressure to the ground or the soil. The skid plate 3 also has the functionality of preventing the module from sinking into the ground, so that the parts of the transplanting module 1 that are located below the skid plate penetrate the ground/soil a predefined distance.

Figure 3:
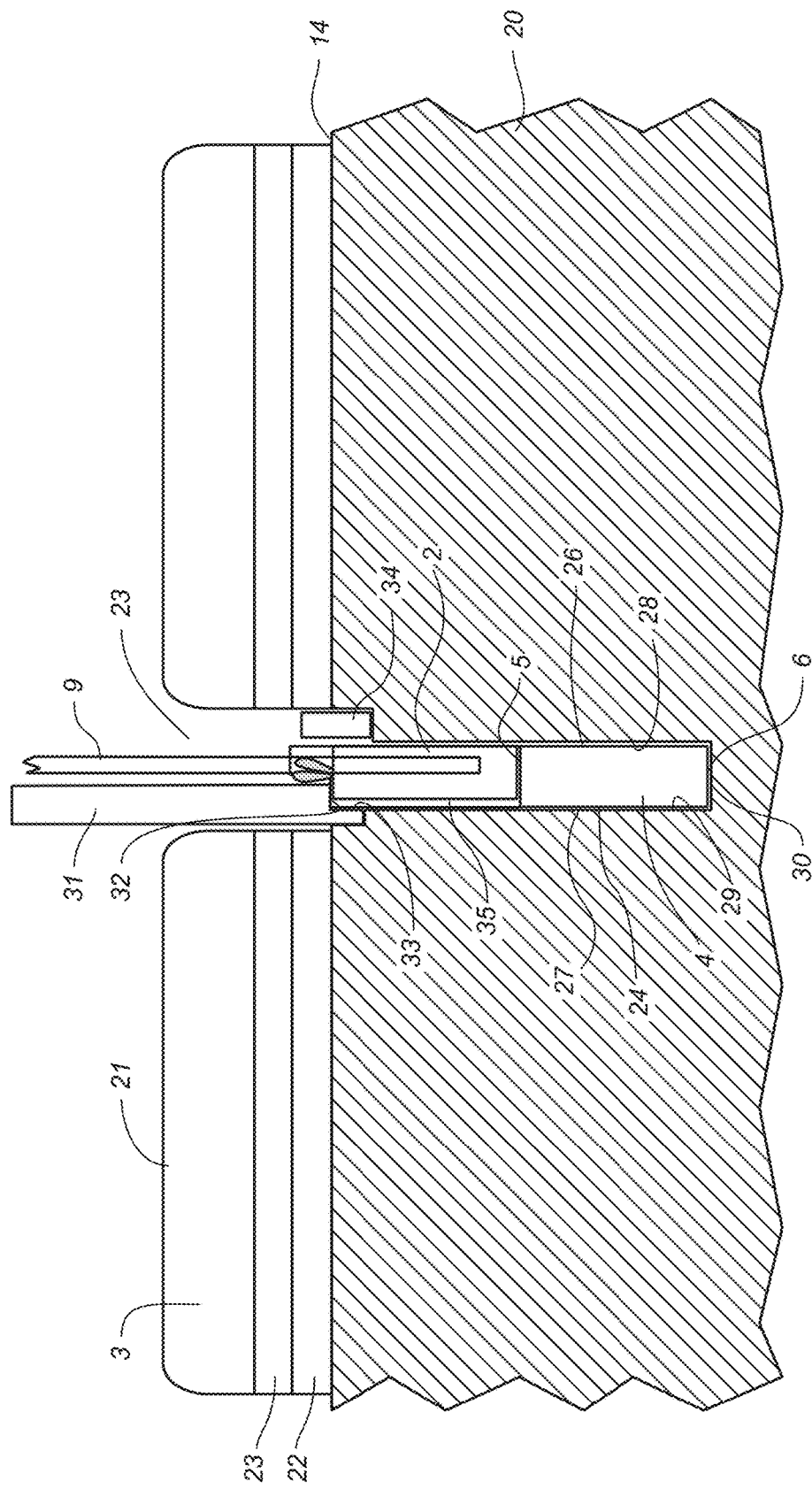
FIG. 3 shows a cross section of the part of the transplanting module that is in contact with the ground, taken along axis III-III.

The module 1 further comprises a keel 4 that is adapted to penetrate the ground, and to create a furrow in the ground, as shown in FIG. 3. The keel has an upper edge 5 and a lower edge 6, where the lower edge of the keel defines the depth of the furrow to be created by the module. The keel 4 may also function as a carrying means for the plant 2 to be transplanted, where the plant 2 may be slid on the upper edge 5 of the keel, in a direction towards the distal end 7 of the module, so that the plant 2 enters the furrow in the same plane as the plane of the keel 4. Distal to the keel, the module 1 may be provided with compacting means 8, are arranged to come into contact with the soil on the sides of the furrow, that may be adapted to compact the sides of the furrow, and thereby closing the furrow after the plant 2 has been introduced into the furrow. The compacting means 8 may be arranged to provide pressure on the soil of to the sides of the furrow, causing the side walls of the furrow to collapse, so that the side walls of the furrow enclose the side walls of the plant 2.

The plant may be transported from the inside of the apparatus and downwards towards the upper edge 5 of the keel, where the transport movement may be facilitated by a transport member 9, that connects with the plant, and pushes the plant along the carrying means and along the upper edge 5 of keel 4, until the plant has passed the distal end 10 of the keel. The transport member 9 may be provided as a rotational transport member that is adapted to rotate inside the module on a rotational drive 11 that drives the transport member 9. The transport means, may be provided in the form of a plurality of transport members that are arranged sequentially along the rotational drive 11, where each transport member may be adapted to transport one plant and the subsequent transport member 9 may transport the next plant from the apparatus and into the furrow.

The module 1 may be attached to a vehicle via coupling means 12 that may be adapted to be attached to the back of a vehicle, and allow the module to be raised and/or lowered, and to allow the vehicle to pull the module 1 along the soil, during transplanting operation, providing motion in the transplanting direction.

FIG. 2 shows a side view of parts of the transplanting module 1, where some parts of the module have been removed, in order to show the transplanting mechanism in accordance with the invention. The driving mechanism 11 may drive a chain 17 that is arranged around a first sprocket 18 and a second sprocket 19 where the driving power is transferred to the chain via the first 18 or the second sprocket 19 and drives the chain in the direction D in a loop. The sprockets 18, 19 are separated by a distance, so that the chain 17 has two longitudinal sides, where the chain is substantially straight and two areas, where the chain is rotated 180 degrees along the sprocket, from one longitudinal side to the other. The chain may be provided with a plurality of transport members 9, that have a proximal end 15 that is attached to the chain 17 and a distal end which is adapted to connect with a plant 2.

When the module 1 is being utilized for transplant operation, the transport members rotate in the direction D, where the transport members 9A are arranged to connect to a plant 2 while the plant is on a carrying means 13 inside the apparatus. The continued rotation causes the plant 2 to be pushed substantially straight towards the lower end of the module in a direction towards the ground 14. When the plant 2B reaches the proximal end of the keel 4, the transport means 9B begins to be rotated along with the chain along the sprocket 18, causing the distal end 16 of the transport means to travel at a higher speed than the proximal end 15, as the distal end will travel a longer distance E in the same time as the rotation close to the sprocket. During this increase in speed, the plant 2A is introduced below the skid plate 3, from above the ground, shown as arrow B to below the ground, shown as arrow C. The plant may be slid along the upper edge 5 of the keel 4, towards the distal end 10 of the keel 4, where the curve of the distal end of the transport member 9C is substantially the same as the curve of the carrying means, below the ground, i.e. the upper edge 5 of the keel. The curve of the distal end 16 of the transport member 9 may be substantially the same as the curve of the carrying means 13 inside the apparatus, and the carrying means below the ground, so that the plant may be maneuvered securely by the transport member along the carrying means 13, 5.

When the plant has been pushed towards the distal end 10 of the keel 4, the side walls of the furrow have come into contact with the side walls of the plant 2B, and the friction between the side wall of the furrow and the plant causes the plant to move in the direction opposite to driving direction A, and the transport member may release the plant. When the transport member 9C has released the plant, the transport member will be rotated along the chain into the position of transport member 9D, lifting the distal end of the transport member from the furrow and away from the ground 14.

When the transport member 9C has released the plant 2, the next transport member will continue the continuous planting operation by pushing the subsequent plant in the same manner as the previous plant, and planting the next plant inside the furrow created by the keel 4.

The plants 2 that are present in the carrying means may be continuously replenished during operation, ensuring that there are enough plants to continuously transplant the plants in a continuous manner in a row. The manner of replenishing the carrying means 13 may be done in a number of different ways, and may be seen as being within the skill of the person skilled in the art based on the present description.

FIG. 3 is a cross sectional diagram taken along axis III-III in FIG. 2, where this diagram shows the operation of the module during transplantation and the interaction with the ground 20 seen in the direction of travel A shown in FIG. 2. The skid plate 3 abuts the surface 14 of the ground 20, ensuring that the module does not sink into the ground below the soil contacting surface of the skid plate 3. The skid plate 3 may be in the form of a ski, having a proximal end 21 that curves away from the soil surface 14. The skid plate may be constructed from two layers, a lower layer 22 that is intended to be worn and is exchangeable and an upper layer 23 that is protected by the exchangeable lower layer 22. When the lower layer 22 is worn, it may be removed from the upper layer 23 and replaced with a new lower layer 22, ensuring that only parts of the skid plate 3 are worn, while the other parts are capable of being reused. The skid plate 3 may be provided with a through going groove 23, creating a passageway from the upper area of the skid plate to the lower area of the skid plate 3, and thereby creating a passageway towards the ground 20.

During transplanting operation, the keel 4 penetrates the ground 20, creating a furrow 24 in the ground 20, where the depth of the furrow is defined by the lower edge 6 of the keel 4, and which creates a bottom 30 of the furrow. The width of the furrow 24 is controlled by the side walls 26, 27 of the keel 4, so that the furrow is provided with corresponding side walls 28, 29.

The upper edge 5 of the keel 4 may be used to carry the plant 2 into the furrow, and thereby separating the plant 2 from the bottom 30 of the furrow. The height of the keel 4 defines the distance which the bottom 30 of the furrow is separated from the plant 2, where this distance may be controlled by the choice of the size of the keel, depending on which type of plant is being introduced into the furrow 24.

The upper edge of the keel, supports the plant from below, and ensures that the plant does not drop into the furrow, prior to discharge. The module may further be provided with a support element 31 that has an edge 32 is adapted to support the plant from above, preventing the movement of the plant 2 in a vertical direction upwards during transplantation, ensuring that the plant does not pop up from the furrow during transplantation. The module 1 may further be provided with a first side support member 33 and a second side support member 34, that ensure that the plant is prevented from moving in a transverse (sideward) direction during transplantation, and keeping the plant on the upper edge 5 of the keel 4. The support member 34 may be applied on only parts of the length of the keel 4, where the side support of the plant in this side may only be necessary during while the plant is entering the furrow 24.

The carrying means 5, 31, 32, 33, 34 inside the ground, may be provided with an opening 35 allowing the side walls 28, 29 of the furrow to come into contact with the plant while it is being transported in the direction opposite to the driving direction, allowing the momentum of the ground to assist in the transport along the carrying means, and relieve the pressure applied to the transport member 9 by the plant during transplant. The opening may furthermore assist in maintaining the transverse position of the plant on the upper edge 5 of the keel, during until discharge, as the side walls of the furrow push onto the plant. Thus, it may be possible to limit the length of the side support members, in the distal direction of the module, where the side wall may e.g. take over the side support of the plant 2 when the plant has reached a certain point along the upper edge 5 of the keel 4.

By allowing the side wall to come into contact with the plant, the plant 2 will obtain a speed that is equal to the ground, which means that when the plant is discharged, the side walls will not cause a shock or a sudden force to be applied to the plant, where such a shock could damage the plant during transplant operation or disturb the position of the plant after discharge.

The depth of the keel 4, and the lower peripheral edge 6 of the keel may be adjusted in accordance with the desired depth of the furrow for a specific plant, so that the distance the keel extends below the ground may be changed. In the same manner, the distance between the upper edge 5 of the keel 4 and the support member 34 and member 31, may be adjusted in accordance with the height of the plant, ensuring that the cross sectional profile of the carrying means corresponds with the cross sectional profile of the plant.

Moreover, when utilizing a plant tape for bedding out of plants a cutting means, e.g., scissors or knife, may be mounted for cutting the plant tape into small tape pieces or units, where each tape piece includes one or more plants. The resulting separating procedure is very easy to carry out when it is desired to divide the plant tape into germinating units.

Figure 4A:
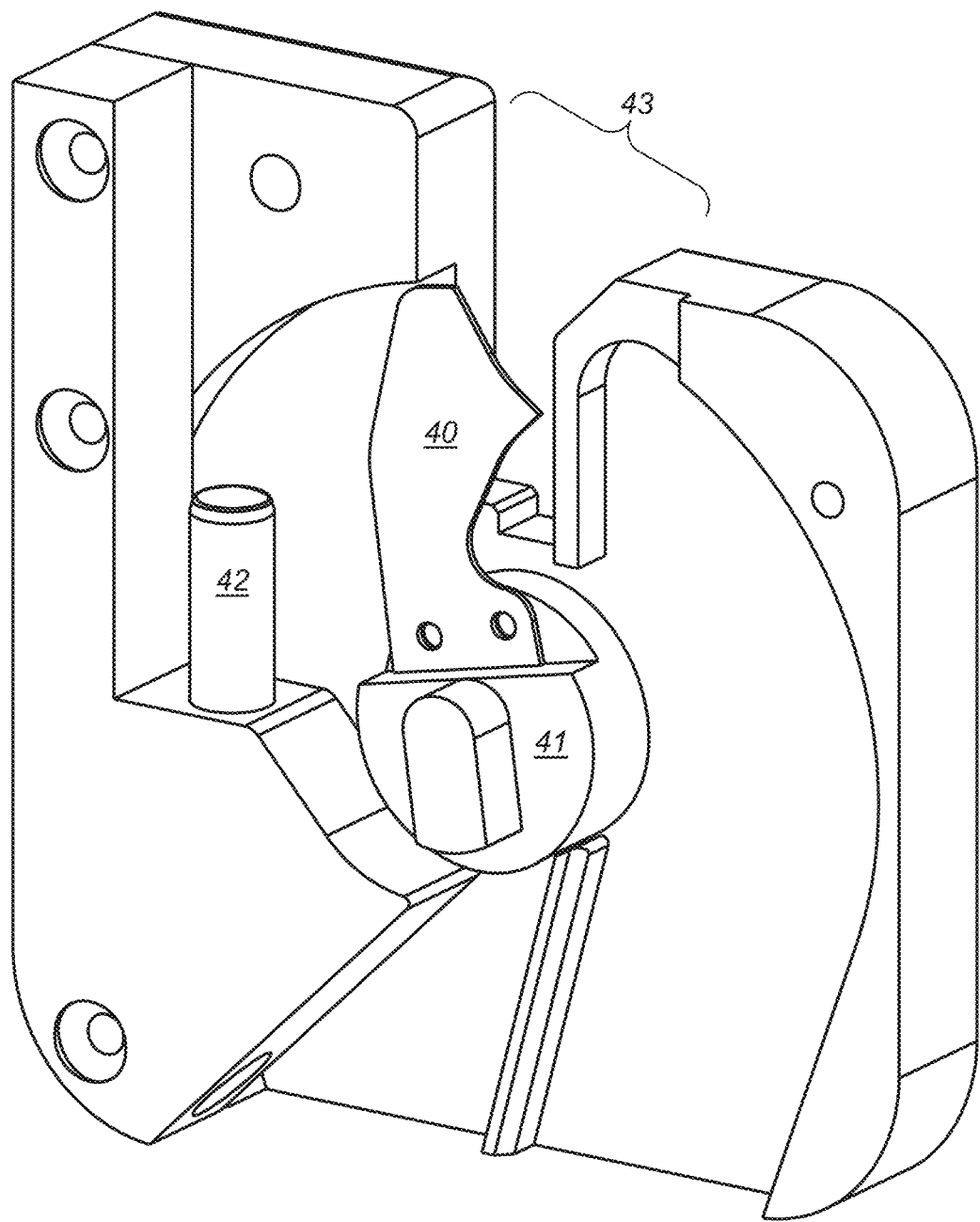
FIGS. 4A and 4B shows one embodiment of a cutting means. In this figure, the cutting means (40) is attached to a circular piece (41). The plant tape (not shown) is fed through the gap (43) and the individual plant pockets are guided forward by the pushers of the transport members (see FIG. 5, below). The circular piece will spin 360 degrees around a central axis cutting the plant tape between each plant pocket/germination unit. The cutting means may be shaped as shown in the figure or any other configuration that will cut the plant tape. As shown, the cutting means is self-cleaning due to its "V-shaped" configuration.

FIG. 4A shows one embodiment of the cutting means. Specifically, a self-cleaning knife having a saber grind is depicted. The cutting means will knock off any adhered dirt or debris from the blade as it cuts the plant tape. In other words, the fabric of the plant tape wipes off the dirt keeping the amount of dirt, mud and/or debris on the blade to a minimum.

Figure 4B:
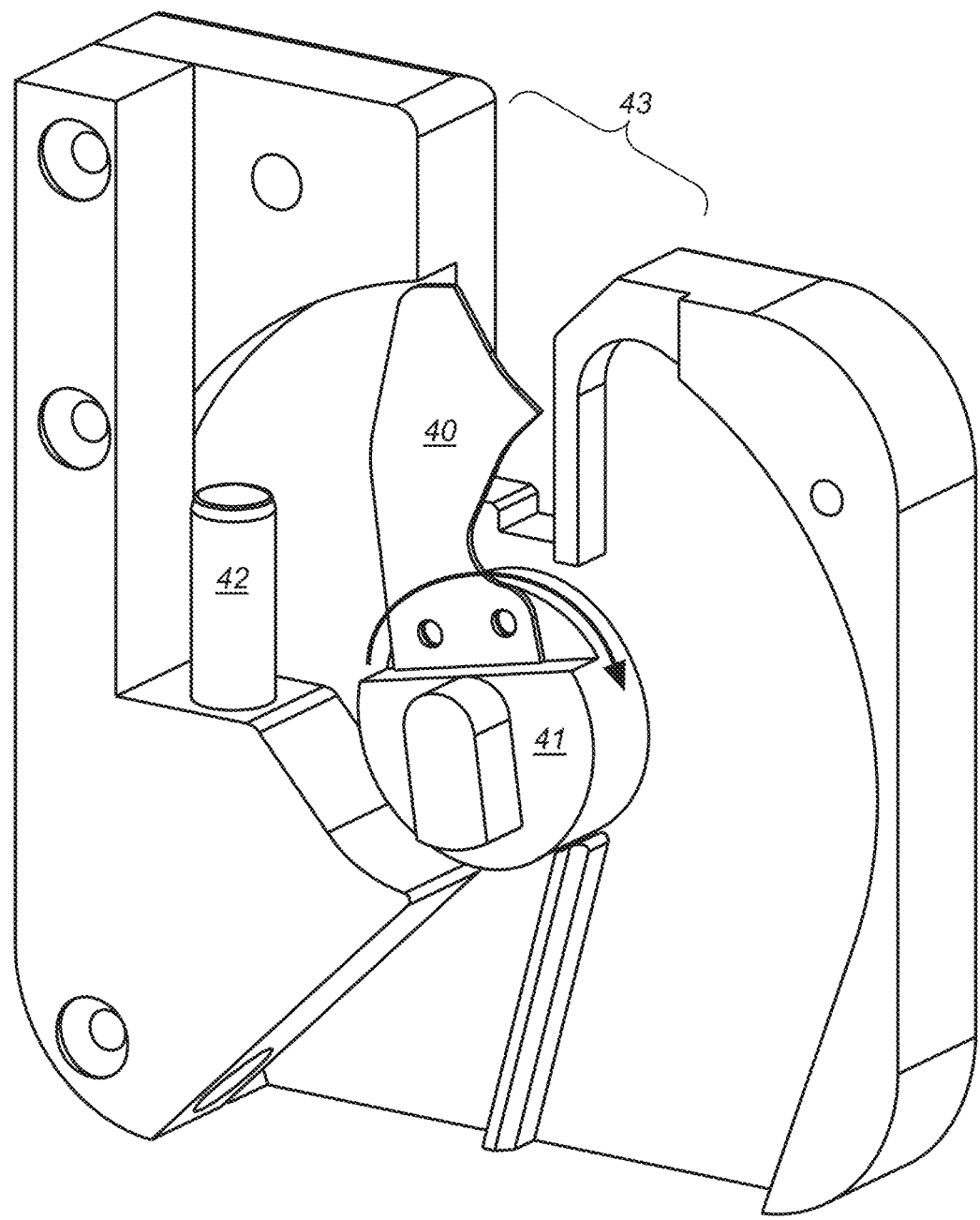
Figure 4C:
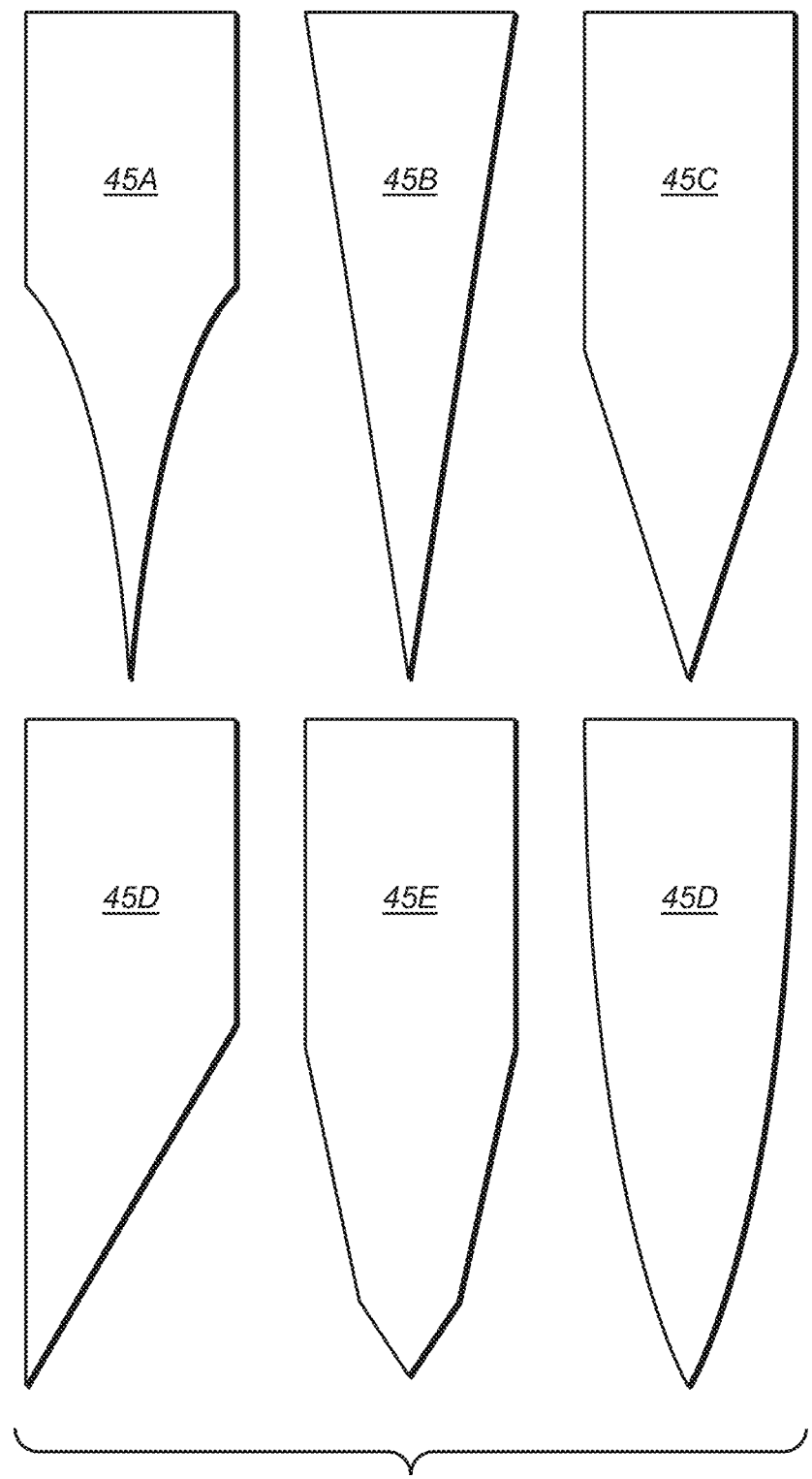
FIG. 4C shows various edges suitable for use in the cutting means. Blades are as follows: 1—hollow grind; 2—flat grind; 3—saber grind; 4—chisel grind; 5—double bevel grind; and 6—convex grind.

The cutting means is attached to a circular means which rotates as shown in FIG. 4B by the yellow arrow. Rotation is around the central axis perpendicular to the face of the circular piece. An alternative is that the cutting means may alternate back and forth rather than rotating through an entire 360 degrees. However, this alternative may result in the cutting means striking the pushers.

Figures 5A, 6:
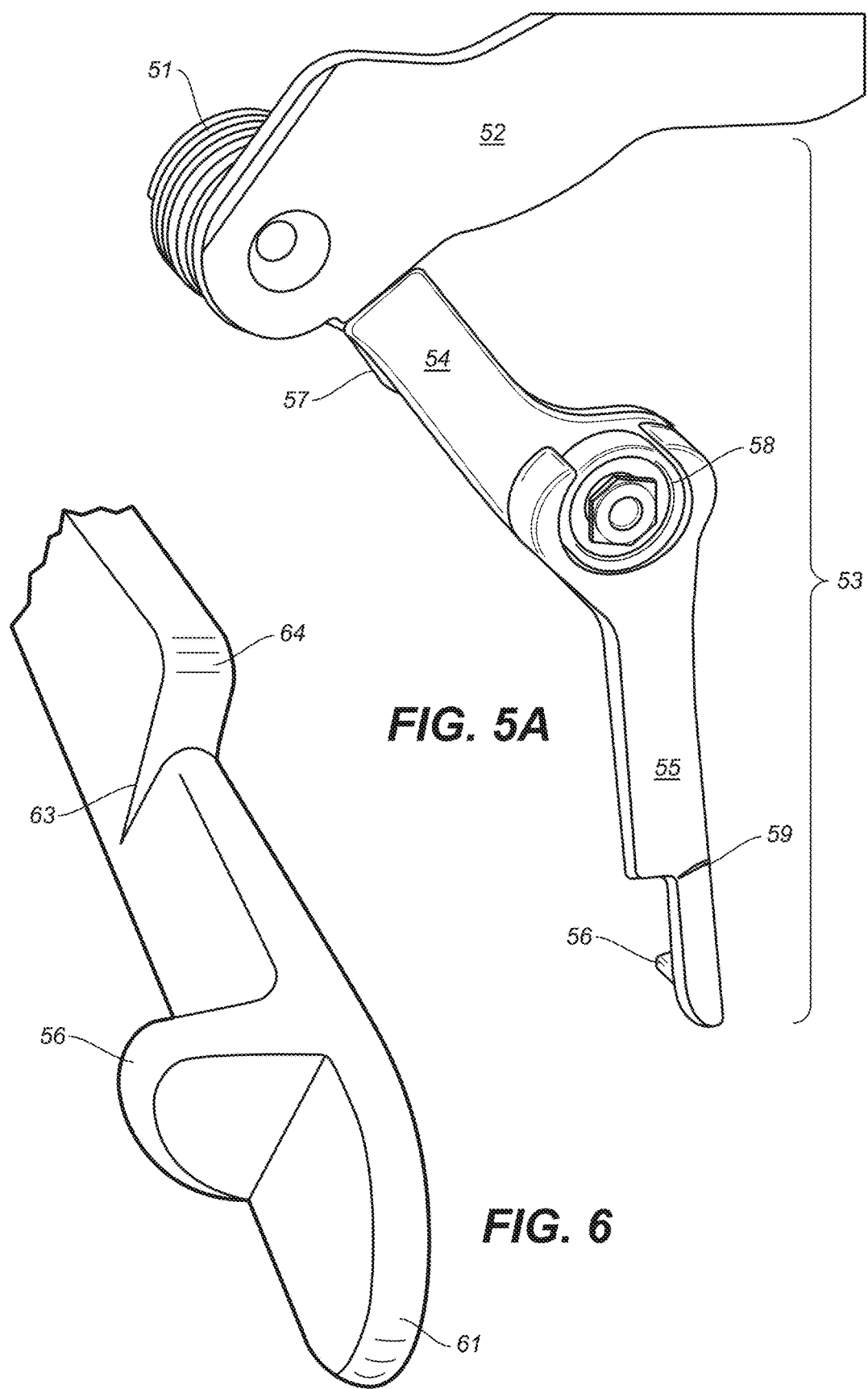
FIG. 5A-C shows a portion of a retractable transport member. The retractable transport members allow for the adjustment of seedling placement, i.e., spacing, at a higher rate of speed.
FIG. 6 is a photograph from the distal tip of the transport member (from the tip of the lower pushing arm towards the connecting arm). The tooth (56) is in the foreground. Also visible is the angle 63 with which the lower portion of the pusher is set at. If the transport member is laid on a flat surface such that the tooth (56) is on the upward facing side and the reverse side (shown in FIG. 5C) is on the flat surface) the front edge would be in contact with the flat surface while the back edge is not. The hilt (64) of the lower pusher is also visible.
Figure 5B:
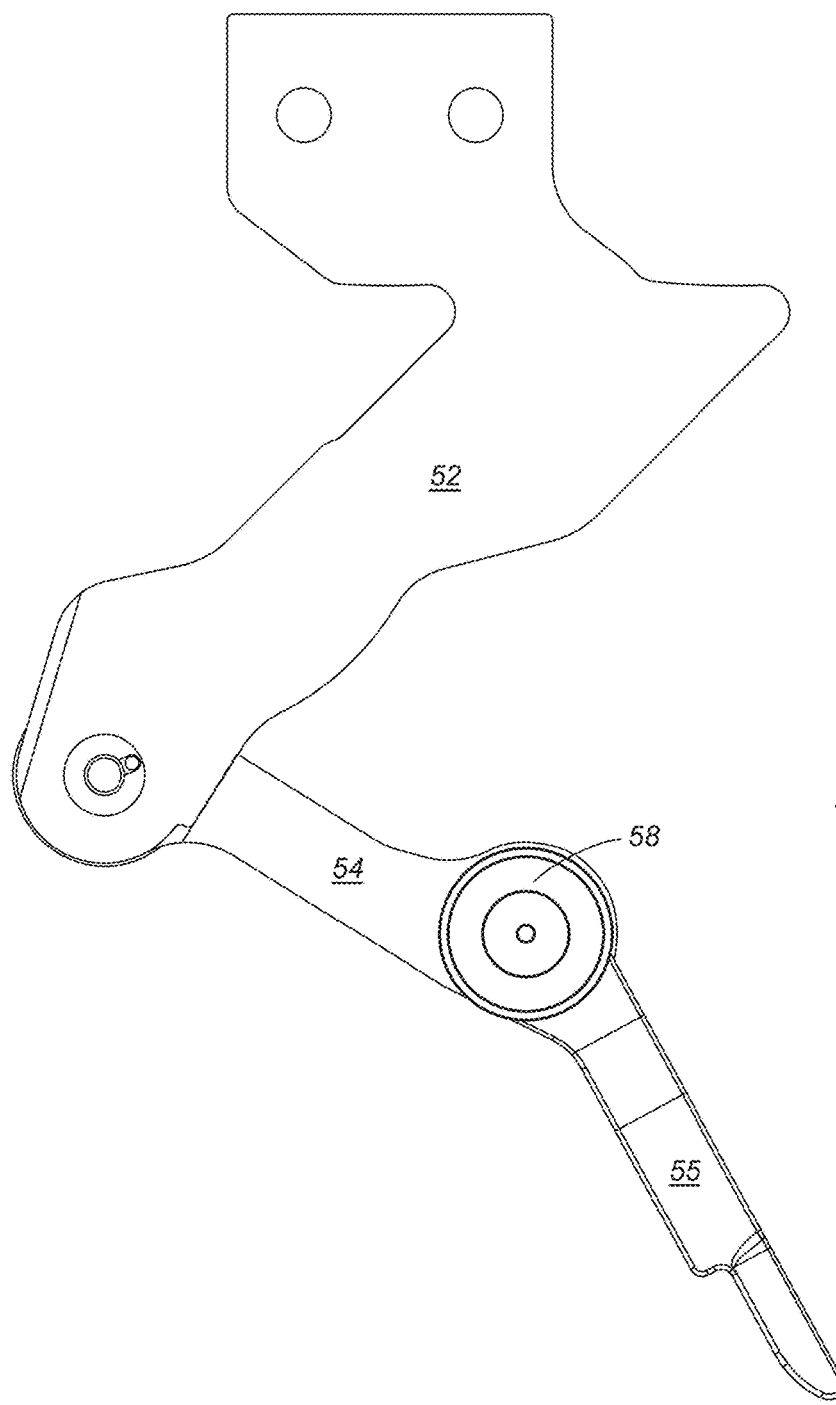
Figure 7:
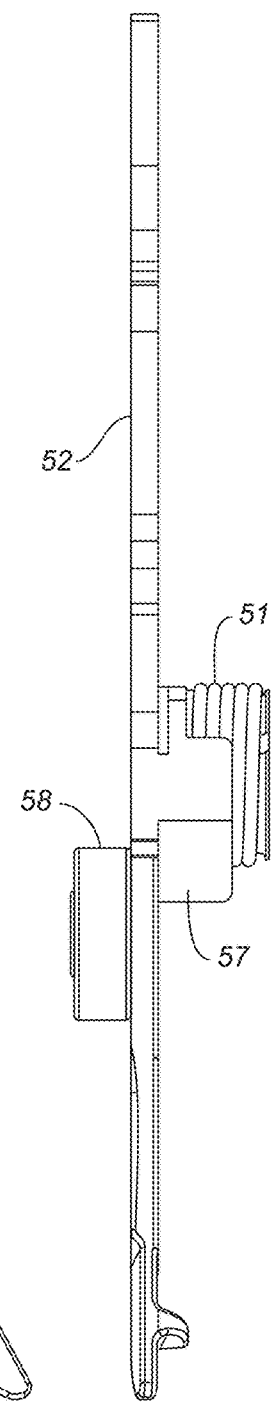
FIG. 7 is a schematic of the cross-sectional (or edge) view of the retractable transporting member as seen on edge from the left of FIG. 5A. The shoulder (57) and the bearing (58) are important for maintaining the proper position of the arm during transplantation.
Figures 5C, 9:
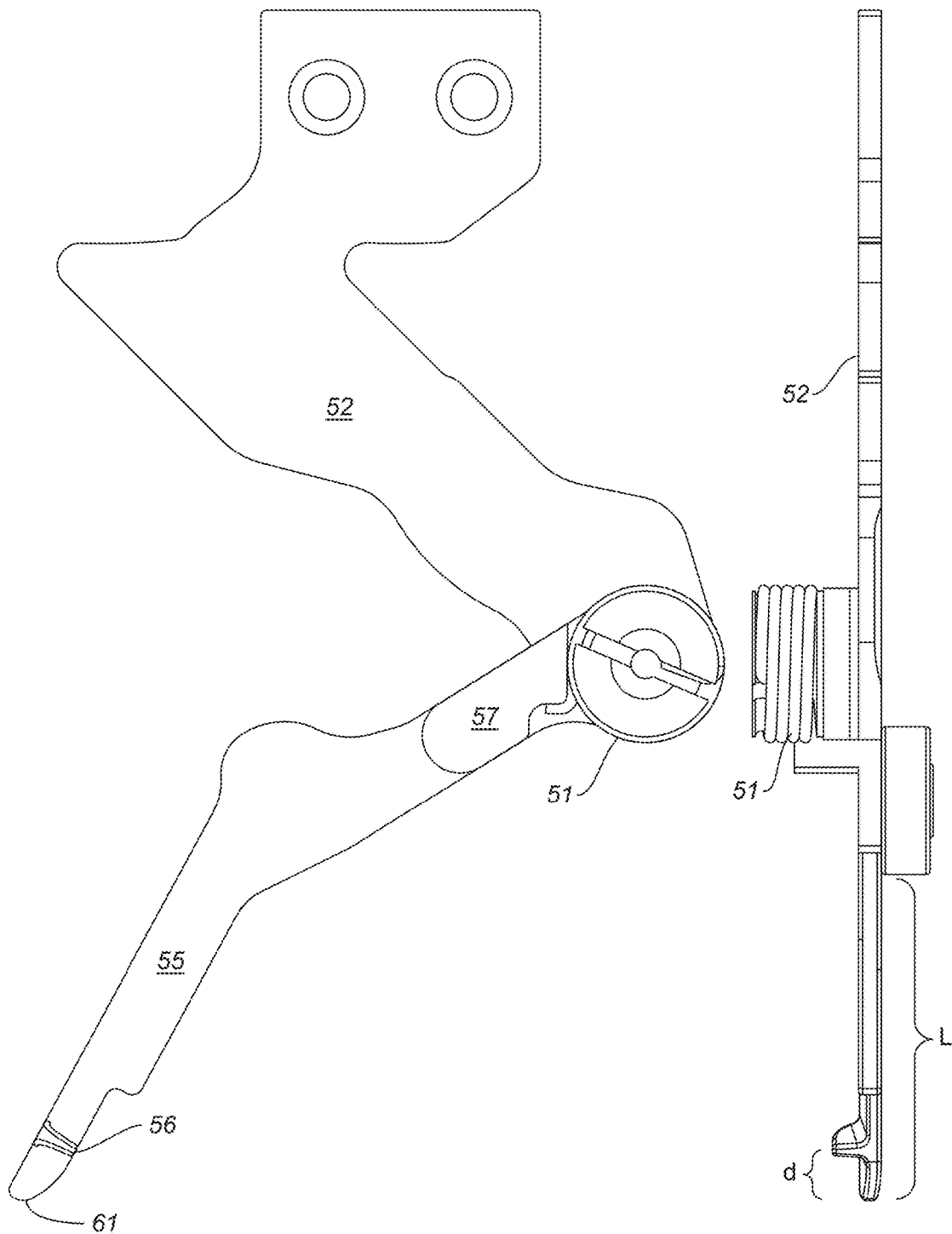
FIG. 9 is a close-up picture of the pusher arm (referring to FIG. 5, above). The tooth (56) on the pushing arm helps position and push the plant/seed pocket. The length from the tip of the pushing arm to the tooth is length d. The length from the tip of the pushing arm to the hilt is length L. The value of d is between ⅜ L to ⅓ L.

FIG. 5A-C is a portion of a retractable transport member with a close up of the pushers of the transport member.

The retractable pushers of the transport means allows for a closer spacing of the plants and operation at a higher speed of transplantation. The retractable pushers begin to retract when the transport means is substantially perpendicular to the soil surface.

The spring and the cam acting on the shoulder of the pusher will retract the pusher. The force of the cam is applied at the brown arrow. The spring exerts sufficient force (i.e., torque) such that the pusher is maintained in the retracted position if no other force is applied to the arm. However, the spring is insufficient to return the pusher to its retracted position and requires the assistance of the cam. As the pusher is lifted back into the retracted position by the cam, the tip of the arm (where the tooth is located) passes over the plant.

If the tooth is above the mid-line (m) then there is a tendency to push the plant pocket over and not place the plant in an upright position.

Various crops require different distances between plants once transplanted. Thus, it is desirable to be able to increase/decrease the crop planting density as different crops are planted. For example, broccoli is typically planted with 3 inches between plants whereas cauliflower is planted with 18-24 inches between plants. Lettuce is typically planted with 6-12 inches between plants. In order to accommodate these differences a gear box is used.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

CITATION LIST

Patent Literature

[1] U.S. Pat. No. 7,421,960—Machine For Bedding Out Seed or Plant Tapes
[2] U57213366—Mixture of a carrier and additives for use in germinating units containing seeds or similar growth-suited parts of a plants as well as a method of producing the mixture
[3] U.S. Pat. No. 7,356,964—Seed tape including successively arranged germinating units as well as a method of germinating the seed tape
[4] U57614181—Seed tape including successively arranged germinating units

What is claimed is:

1. An apparatus for transplanting plants comprising a transplanting module configured to transplant a plurality of plants in a row, the transplanting module comprising:
    a soil contacting surface being substantially planar to a soil to be planted and having a longitudinally extending surface area which is substantially planar and extends substantially parallel to the soil and being positioned to substantially support the weight of the apparatus,
    a keel member to create a furrow in the soil where the keel extends a predefined distance below the soil contacting surface, where an outer periphery of the keel member defines the depth of the furrow,
    a carrying means configured to support the plant, where the carrying means extend from a position that is above the soil contacting surface, adjacent said soil contacting surface, to a position below the soil contacting surface, and extending a predefined depth into the furrow for transporting of the plant from the apparatus and into the furrow where the carrying means has a distal end for discharging the plant, and where the carrying means are configured to expose an outer periphery of the plant below the soil contacting surface so that at least one side wall of the furrow comes into contact with an outer periphery of the plant before the plant is discharged from the distal end of the carrying means,
    a transport means for supporting and transporting the plant via the carrying means and into the furrow along a longitudinal axis that is substantially parallel to the planting direction of the apparatus, where the transport means is configured to release the plant, when the plant has reached its predefined depth into the furrow.

2. An apparatus according to claim 1 further comprising a compacter to compact the soil that is to be planted.

3. An apparatus according to claim 1 where the plant to be transplanted is a seedling.

4. An apparatus according to claim 3, wherein the plant to be transplanted comprises an enclosure to hold the seedling.

5. An apparatus according to claim 1 wherein the carrying means is configured to provide support to the plant from below, at least one side and/or from above, ensuring that the orientation of the plant is maintained in a predetermined fashion during the transport and until the discharge of the plant into the soil.

6. An apparatus according to claim 1 wherein the carrying means comprises a through-going opening at a transverse periphery of the carrying means allowing a side wall of the furrow to come into contact with the plant.

7. An apparatus according to claim 1 wherein the carrying means separates the plant from the soil in a vertical direction prior to discharge.

8. An apparatus according to claim 1 wherein the transport means comprises at least one transport member having a proximal end connected to a driving mechanism and a distal end that connects with the plant to be planted.

9. An apparatus according to claim 1 wherein the transport means comprises at least one transport member that enters the furrow at an angled position from vertical and is adapted to rotate along the longitudinal axis of the apparatus towards a substantially vertical position where the distal end reaches its ultimate depth into the furrow and where the continued rotation raises the distal end out of the furrow.

10. An apparatus according to claim 1 wherein a distal end of the transport means is configured to release the plant at a substantially vertical position.

11. An apparatus according to claim 1 wherein the outer periphery of the keel member has a proximal part and a distal part, where the distal part extends a greater distance below the soil contacting surface than the proximal part.

12. An apparatus according to claim 11 wherein the increase in distance is gradual along the longitudinal axis of the keel member.

13. An apparatus according to claim 1 wherein at least two transplanting modules are positioned side by side in order to transplant at least two rows.

14. An apparatus according to claim 1 wherein the vertical axis of the plant to be planted is parallel to a longitudinal plane of the keel member.

15. An apparatus according to claim 1 wherein the transport means comprises a retractable pusher arm.

16. An apparatus according to claim 1 or 15, configured to allow for the adjustment in the distance between the transplanted plants.

17. The apparatus of claim 16, wherein the distance between the transplanted plants ranges from about 8 centimeters to about 26 centimeters.

18. A method of transplanting a plurality of plants in a row using an apparatus according to claim 16.

19. An apparatus of claim 1 wherein said keel extends a predefined distance directly below and downwardly from the soil contacting surface.

20. An apparatus of claim 1 wherein the carrying means extends through said soil contacting surface.

21. An apparatus of claim 1 wherein the keel includes an upper edge configured to support the plant when it is released from the carrying means to support the plant prior to discharge from the transport means.

* * * * *